United States Patent Office 3,296,703
Patented Jan. 10, 1967

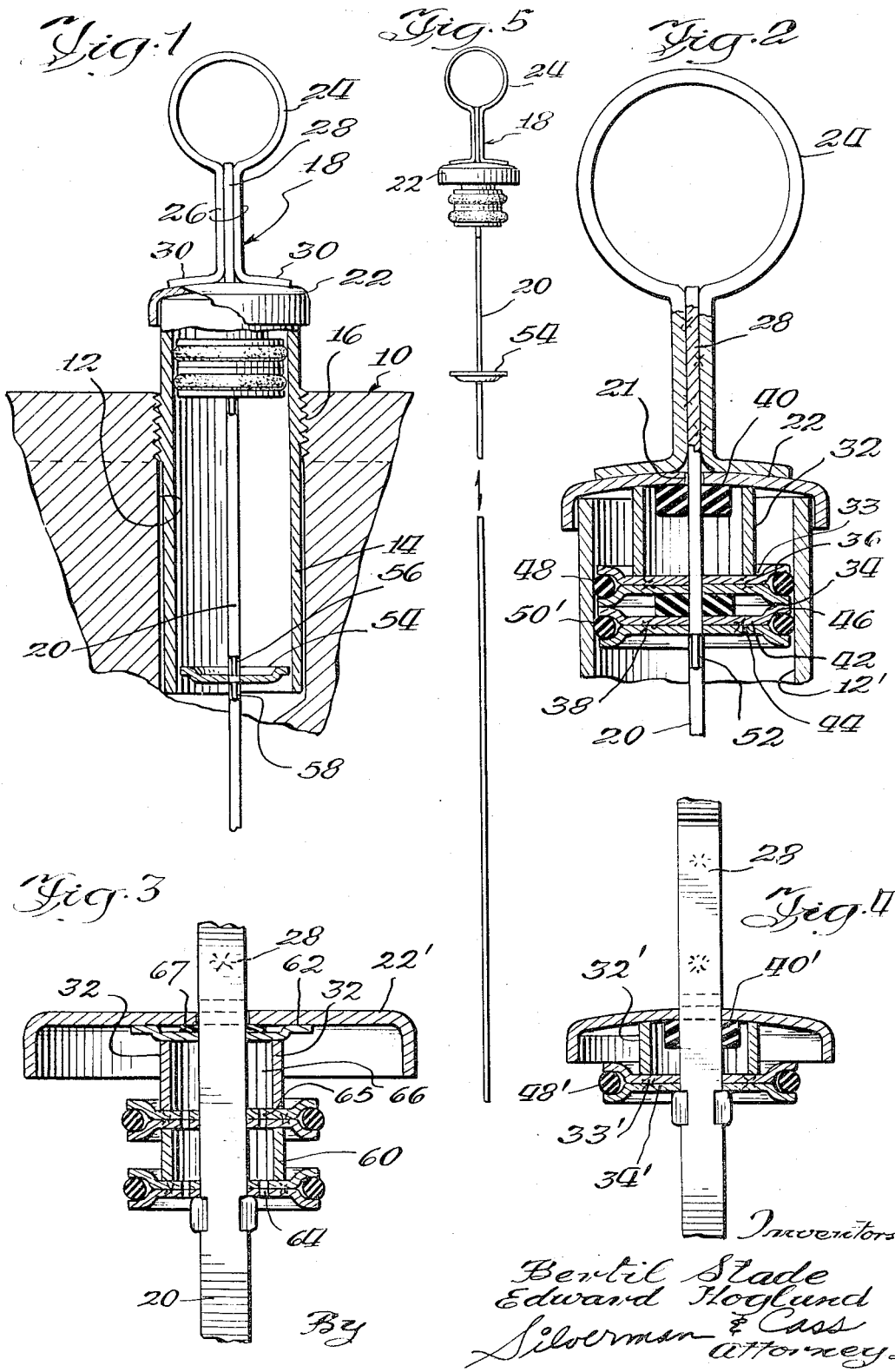

3,296,703
DIP STICK AND HOUSING THEREFOR
Bertil Stade, Oak Park, and Edward Hoglund, Park Ridge, Ill., assignors to Mercury Metal Products, Inc., Hillside, Ill., a corporation of Illinois
Filed Apr. 20, 1964, Ser. No. 360,822
6 Claims. (Cl. 33—126.7)

This invention relates generally to a dip stick and a housing therefor, and more particularly is concerned with the construction of the type of gauge used primarily in an internal combustion engine in order to ascertain the level of various fluids used in the engine.

The primary object of the invention is to provide a dip stick of extremely simple and rugged construction but which will provide a dirt-free, moisture-free, and if desired, an air tight connection with an engine block or a housing or receptacle installed in the said block.

Still another object in the invention is to provide a dip stick of the type which may be made up of simple sheet metal members easily formed and assembled, yet highly effective.

Still a further object of the invention is to provide a dip stick which includes means supporting O-rings to cooperate with a socket or receptacle provided in an engine block so that the connection between the dip stick and the engine is dirt and moisture proof.

Still a further object of the invention is to provide a construction for a dip stick in which the parts forming the dip stick may be used to build up many different forms of dip stick for different purposes and different sizes of engines.

Many other objects and adventages of the invention will become apparent to those skilled in this art as a description of the preferred embodiment is set forth hereinafter in connection with which the drawing illustrates the same.

FIG. 1 is a fragmentary sectional view taken through a portion of an engine or the like, having a receptacle installed therein and a dip stick engaged in the receptacle, the dip stick being of the construction of this invention.

FIG. 2 is an enlarged sectional view of the upper portion of FIG. 1.

FIG. 3 is a fragmentary sectional view through a modified form of dip stick constructed in accordance with the invention.

FIG. 4 is a fragmentary sectional view for still a modified but simpler form of the invention.

FIG. 5 is a side elevational view of the dip stick of FIG. 2 shown disengaged.

Referring now to the drawing, in FIG. 1 there is illustrated a portion of the block of an engine designated generally by the reference character 10 having an opening or passageway 12 formed therein leading to a sump of some kind which is not shown. This sump may be the crankcase or it may be a reservoir of hydraulic fluid, transmission lubricant, or the like. A receptacle or housing 14 of generally cylindrical tubular construction may be threaded into the passageway 12 as shown at 16, or may be force fitted into the passageway 12 without the use of threads. As will be seen hereinafter, it is feasible for the purposes of the invention to bore a passageway 12 into the block 10 of a size to fit the dip stick directly and without the need for the housing or receptacle 14.

The dip stick itself is designated 18 and the same is formed of sheet metal suitably stamped and assembled in a manner calculated to provide a sturdy but highly economical structure.

There is an elongate blade 20 of generally rectangular cross-section, the blade 20 usually having suitable length to enable the same to dip into the fluid being measured. The blade may be quite short and coupled to an extension such as a highly flexible wire, attached, for example, at the bottom end of the fragment illustrated in FIG. 1 so that tortuous passageways may be traversed by said more flexible extension.

At its upper end 28 the blade extends through a dome-like cap 22, the cap being slotted at 21 to enable the dip stick blade 20 to be threaded therethrough. A finger ring 24 having depending parallel extensions 26 which straddle the protruding end 28 of the blade also has angular bent feet 30 and is welded both to the upper extension 28 and the top of the cap 22. On its interior, the dip stick has a plurality of loosely engaged parts each threaded or strung upon the dip stick blade 20 just as one might string beads and the entire group held in assembly by simple pinches or deformations serving as stop means. Thus the dip stick of FIG. 1 is shown in detail in FIG. 2 and it will be seen that there is a simple split sleeve 32 which forms a spacer, a pair of dished washers 33 and 34 arranged back to back with their concave sides outwardly so as to provide an annular groove 36 between them. The spacer 32 is centered, engaged and seated by the concavity of the washer 33. Next upon the blade 20 there is a rubber washer 38 which is tightly engaged by friction alone on the blade so as to prevent fluid from escaping upward past the dip stick or moisture or dust from entering downward into the passageway 12'. If desired another rubber washer may be disposed on the dip stick blade 20 at the point where it passes through the cap, the latter rubber washer being designated 40.

Continuing with the description of the members which are assembled on the blade 20 there is another pair of similarly arranged dished washers 42 and 44 back to back and providing another groove 46. O-rings are engaged within the respective grooves 36 and 46 as shown at 48 and 50' respectively. The diameter of the O-rings and the dimensions of the annular grooves 46 and 36 are such that there will be a circumferential portion of the O-rings protruding beyond the washers so that when the dip stick is engaged within the housing 14 or a suitable bore or passageway in the block, there will be a fluid-tight connection between the O-rings and the bore. All of the parts described above are loosely assembled during the manufacture of the dip stick and moved against the bottom surface of the cap 22 after which the pinch or upset is formed on the blade as shown it 52. Alternately, the washers and sleeve 32 may be assembled on the end of the blade 20 which has the pre-formed stop means 52, the blade end 28 pushed through the opening in the cap 22 and the finger piece 24 welded in place thereafter.

Preferably, another washer 54 of identical construction as the washers 33 and 34, 42 and 44, is mounted to the blade 20 spaced from the stop means 52. Again suitable upsets or pinches may be provided at 56 and 58 to locate the washer 54. This washer 54 serves as a splash guard. It also serves as safety means in case any of the parts of the upper assembly get loose and would otherwise slide down into the reservoir of the engine. If desired still another stop means in the form of a pinch or other deformation may be placed in the blade 20 spaced below the splash guard 54 just in case the splash guard itself gets loose.

FIG. 3 is a modified form of the invention in which the cap 22' is somewhat flatter in configuration and there is an additional split sleeve 60 between the O-ring assemblies. Also a single washer 62 is engaged between the sleeve 32 and the under surface of the cap 22'. In all other respects the construction is the same as that previously described.

It will be appreciated that any number of pairs of washers carrying O-rings may be assembled together with suitable spacers and with or without rubber washers to make any desired type of dip stick. For example, even a single O-ring may be mounted in accordance with the invention as shown in FIG. 4. Here, there is only one pair of washers designated 33' and 34' carrying the O-ring 48'. The same arrangement of sleeve 32' and rubber washer 40' may be used.

It will be appreciated that the dip stick of the invention may be sold without too much additional expense along with a tube or housing such as 14 to enable any manufacturer of engines or similar machinery readily to adapt his equipment for the use of such a type of dip stick.

Normally the washers forming the supports for the O-rings are imperforate. It may be desirable to perforate the same where ventilation is needed. In FIG. 3, for example, the washers are perforated as shown at 64 and 65 so that the passageway within which the dip stick is installed has free access to the atmosphere by way of these perforations and the slot 66 of the upper split sleeve 32. Exterior liquids and dust will not readily enter because of the protective flange of the cap 22' and if desired, a suitable rubber washer at 67 may prevent entrance of moisture through the cap 22' at the point where the blade 20 passes through the same.

Preferably each pair of washers is welded together as shown by suitable spot-welding techniques. This enables each O-ring assembly to be pre-fabricated with its O-ring in place and easily assembled on a blade. Obviously the parts are formed simply and can be assembled in any desired fashion. Any dip stick is made from only six different kinds of parts—a blade, a finger piece, a cap member, a washer, a sleeve and an O-ring. The same kind of washer serves as a part of the O-ring assemblies, a splash guard or a spacer as at 62 in FIG. 3.

Considerable variation is capable of being made without in any way departing from the spirit or scope of the invention as defined in the appended claims.

What it is desired to secure by Letters Patent of the United States is:

1. A dip stick comprising an elongate blade of strip stock, an annular cap member having a center slot, the blade end extending through the slot and arranged coaxial with the cap member, a finger piece secured to the top of the cap member and to said blade end, thereby also securing said blade end to the cap member, the cap member having a protective depending flanged edge, a cylindrical sleeve member coaxial with said blade, and disposed adjacent the bottom of the cap, a pair of identical dished washers engaged back to back and each having a slot of configuration to slidably engage upon said blade, the upper washer having its concavity facing upward and seating said sleeve member therein, the lower washer having its concavity facing downward, the washers having offset flanged formations about their circumference and forming between them an annular groove when so engaged, a resilient O-ring in the groove and protruding slightly radially outward from the washers, a deformation in the blade engaging beneath the lower washer and securing said sleeve member and washers against axial sliding and in aligned engagement with the bottom of the cap member.

2. A dip stick as claimed in claim 1 in which there is a second pair of washers of similar construction and having a second O-ring, said second pair being interposed on said blade between said deformation and the first pair.

3. A dip stick as claimed in claim 2 in which there is a second sleeve member between the pairs of washers, the downward facing concavity of the first pair and the upward facing concavity of the lower pair serving to seat the respective ends of said second sleeve member.

4. A dip stick comprising an elongate blade of strip stock, an annular cap member having a center slot, the blade end extending through the slot, a finger piece secured to said blade end, means securing the cap member on said blade, the cap member having a protective depending flange, sleeve means disposed adjacent the bottom of the cap, at least a pair of identical dished washers engaged back-to-back and each having a slot configuration to slidably engage upon said blade, the upper washer having its concavity facing upward and seating said sleeve means therein, the lower washer having its concavity facing downward, the washers having offset flanged formations about their circumference and forming between them an annular groove when so engaged, a resilient O-ring in the groove and protruding slightly radially outward from the washers, a deformation in the blade engaging beneath the lower washer and securing said washers against axial sliding and said sleeve means in aligned engagement with the bottom of the cap member.

5. A dip stick as claimed in claim 4 in which there is a packing member on said blade interior of said sleeve means for preventing passage of moisture through said cap.

6. A dip stick as claimed in claim 4 in which the sleeve means is coaxial with the cap member and the washers of each assembly are welded together.

References Cited by the Examiner

UNITED STATES PATENTS

| | | | |
|---|---|---|---|
| 1,556,104 | 10/1925 | Gregg | 277—190 |
| 2,333,838 | 11/1943 | Wilson | 33—126.7 |
| 2,705,372 | 4/1955 | Cornell | 33—126.7 |
| 2,953,939 | 9/1960 | Rains | 33—126.7 |
| 3,195,907 | 7/1965 | Eckenrod | 277—188 |

FOREIGN PATENTS

| | | |
|---|---|---|
| 961,319 | 9/1957 | Germany. |
| 664,940 | 4/1949 | Great Britain. |

LEONARD FORMAN, *Primary Examiner.*

W. K. QUARLES, JR., *Assistant Examiner.*